US005834090A

United States Patent [19]

Huang

[11] Patent Number: 5,834,090

[45] Date of Patent: Nov. 10, 1998

[54] CELLULAR STRUCTURE

[75] Inventor: Chung-Chen Huang, Taipei, Taiwan

[73] Assignee: Teh Yor Industrial Co., Ltd., Taiwan

[21] Appl. No.: 637,136

[22] Filed: Apr. 24, 1996

Related U.S. Application Data

[63] Continuation-in-part of Ser. No. 367,030, Dec. 28, 1994, Pat. No. 5,525,395.

[51] Int. Cl.[6] .......... B32B 3/12

[52] U.S. Cl. .......... 428/116; 428/188

[58] Field of Search .......... 428/116, 188; 160/84.05; 52/793.1; 493/966

[56] References Cited

U.S. PATENT DOCUMENTS

| | | | |
|---|---|---|---|
| Re. 30,254 | 4/1980 | Rasmussen | 427/12 X |
| 4,095,639 | 6/1978 | Ryan | 160/84.02 |
| 4,388,365 | 6/1983 | Suominen | 428/12 |
| 4,450,027 | 5/1984 | Colson | 428/116 X |
| 4,622,255 | 11/1986 | Anderson | 428/116 |
| 4,673,600 | 6/1987 | Anderson | 428/12 |
| 4,677,012 | 6/1987 | Anderson | 428/116 |
| 4,677,013 | 6/1987 | Anderson | 428/116 |
| 5,097,884 | 3/1992 | Sevcik et al. | 428/116 X |
| 5,129,440 | 7/1992 | Colson | 428/116 X |
| 5,313,998 | 5/1994 | Colson et al. | 428/116 X |
| 5,390,720 | 2/1995 | Colson et al. | 160/84.1 D |
| 5,425,408 | 6/1995 | Colson | 160/84.07 |
| 5,425,508 | 6/1995 | Colson | 160/84.07 |
| 5,482,750 | 1/1996 | Colson et al. | 428/12 |
| 5,525,395 | 6/1996 | Huang | 428/116 |
| 5,630,900 | 5/1997 | Huang | 160/84.05 X |
| 5,692,550 | 12/1997 | Ford et al. | 160/84.05 |

FOREIGN PATENT DOCUMENTS

| | | |
|---|---|---|
| 0775788 | 11/1996 | European Pat. Off. . |

*Primary Examiner*—Henry F. Epstein
*Attorney, Agent, or Firm*—Olson & Hierl, Ltd.

[57] ABSTRACT

The cellular structure embodying the present invention includes a length of resilient material folded to form a plurality of planar layers. Each layer is attached to an adjacent layer to from a plurality of cells. Each cell includes a pleated side and an opposing support side. The pleated side has a fold defined by the material. Conversely, the support side has a straight length defined by the material. The cells are configured such that, when the structure is extended, the support sides are coplanar to each other and the pleats are uniformly distributed. Furthermore, the material forming each layer provides for resiliently returning the structure to at least a partially collapsed condition.

27 Claims, 4 Drawing Sheets

CELLULAR STRUCTURE

RELATED APPLICATIONS

This application is a continuation in part of U.S. patent application Ser. No. 08/367,030, filed on Dec. 28, 1994, and issued as U.S. Pat. No. 5,525,395 on Jun. 11, 1996.

TECHNICAL FIELD OF THE INVENTION

The present invention relates to an expandable cellular structure having a plurality of parallel tubular cells such as used in window coverings, and in particular to an expandable cellular structure which, when expanded, has a uniformly shaped outer surface.

BACKGROUND OF THE INVENTION

Expandable cellular structures used as window shades consisting of a plurality of elongated tubular cells are well known in the art. Normally, these expandable structures are used in applications such as providing a covering for a window or the like.

The cells within such structures are constructed of a flexible material with each cell being disposed across the width of the material and in a parallel relationship to the other cells. The volume occupied by each cell is decreased or expanded, respectively, by collapsing the cells together or spreading them apart. The expandable attributes of the cells provides a useful structure for covering areas of various size.

Many of the current cellular structures have pleats extending along the length of each cell. The pleats are generating by placing creases in the material during cell fabrication. The pleats assist in the orderly collapsing of individual cells as the structure is compressed. The pleats also result in the front and rear surfaces of the structure having a corrugated appearance which is similar to that of an accordion.

When the cellular structure is used in applications such as covering a window, the cells are usually disposed horizontally such as shown in FIG. 1 of Anderson U.S. Pat. No. 4,673,600. However, the predominance of the pleats emanating from those cells towards the top of the structure will gradually diminish as the amount of weight being supported by each cell increases. Thus, the cellular structure will fail to provide a uniformly distributed pleated appearance. The top cells will appear almost flat while the bottom cells will remain substantially pleated.

Other cellular structures such as shown in FIG. 3 of Anderson U.S. Pat. No. 4,677,013 have an asymmetrical construction for maintaining uniformity in the appearance of the shade. The front wall of each cell is pleated and, conversely, the rear wall of each cell is essentially straight or linear when the shade is expanded. In this type of cell construction, the crease formed within the rear wall of each cell will slowly cease to exist as the cellular structure is extended for a prolonged period of time. The disappearing creases will, in turn, result in a failure of the cellular structure to collapse in an orderly manner because the rear wall will randomly fold either inside or outside of the cell. There is no force provided by the cell itself to direct the rear wall to fold one way or the other. The result is a completely undesirable appearance.

Accordingly, what is needed is a window shade which maintains the same pleated appearance from top to bottom when it is fully extended. The cellular structure of the window shade should be designed such that the cells collapse repeatably the same way to provide for a uniform and desirable appearance. The present invention meets these desires.

SUMMARY OF THE INVENTION

The present invention is a cellular structure having a uniformly pleated outer surface on its front face and rear face. The cellular structure embodying the present invention is especially suitable for use as a window covering or shade. The structure has an aesthetically pleasing pleated appearance which does not dwindle away over an extended period of time. In addition, each cell along the outer surface of the structure has a uniform shape and size. The structure will consistently collapse in an orderly manner.

The collapsible covering embodying the present invention includes a plurality of cells having a pleated side and an opposing support side. Layers of resilient material are attached together to form a plurality of cells which are defined as the material forming each layer is deflected. The pleated side is defined by at least one of the folds in the material. Conversely, the support side has a substantially straight length defined by the material. The cells are configured such that, when the structure is extended, the support sides are substantially coplanar to each other and the pleats are uniformly distributed. In addition, the resilient material forming each layer applies a force for returning the structure to at least a partially collapsed condition.

The pleats are uniformly distributed when the structure is expanded since only the support side of each cell, which has a shorter length than the pleated side, sustains the weight of the structure. In addition, the structure will orderly return to at least a partially collapsed condition with the support sides folding away from respective pleated sides whenever the deflected material within each layer is allowed to resiliently return to its original planar shape.

DETAILED DESCRIPTION OF THE PREFERRED EMBODIMENTS

The present invention provides an expandable cellular structure having a uniform appearance between each expanded cell. The cellular structure embodying the present invention includes a resilient material which is folded to form a plurality of layers with adjacent layers being attached together by a line of adhesive. As the material forming each layer is deflected, the layers define a plurality of cells having a pleated side and an opposing support side. The pleated side of each cell is defined by at least one fold. Conversely, the support side of each cell forms a substantially straight length which, when the structure is extended, is coplanar to the support sides of the other cells. Furthermore, the material forming each layer will apply a force for resiliently returning the structure to at least a partially collapsed condition.

Figure 1:
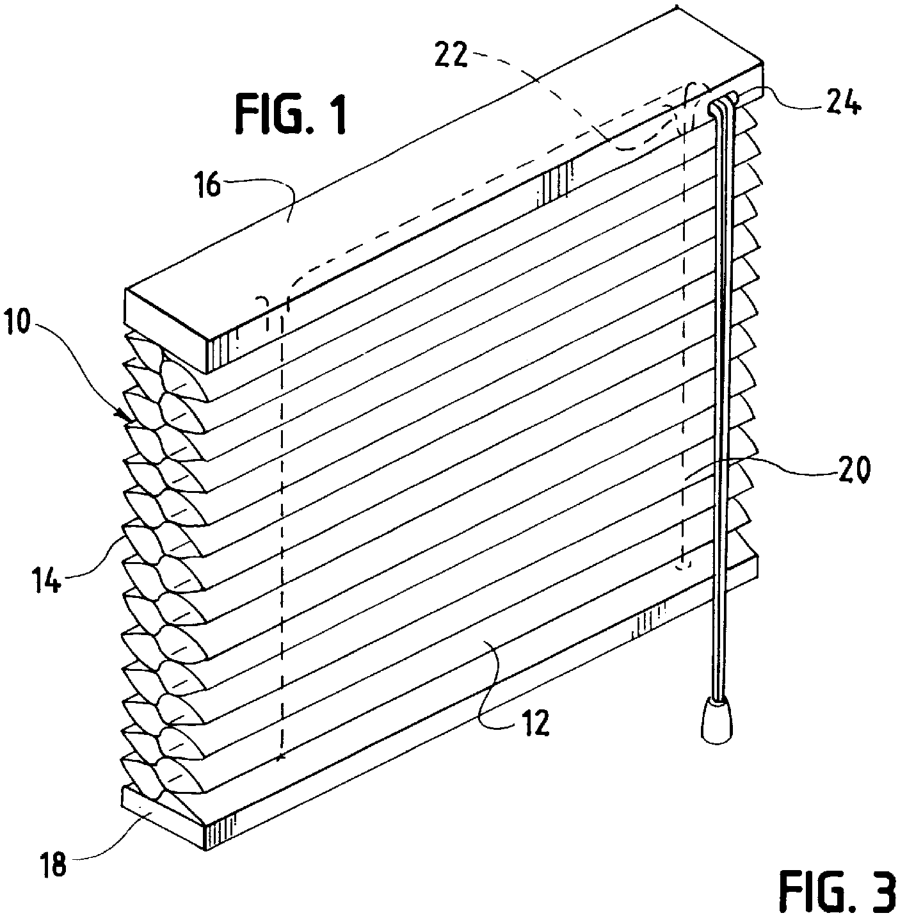
FIG. 1 is a perspective view of a cellular structure in its partially collapsed condition and fabricated in accordance with the present invention.

Referring to the drawings, and particularly to FIG. 1, a perspective view is provided of a cellular structure 10. The cellular structure 10 has a front surface 12 and a rear surface 14 and is mounted within a conventional headrail 16 and foot rail 18 combination. The headrail 16 may be adapted for mounting onto a window frame or the like. Thus, the cellular structure 10 is hung from the headrail 16 and has the foot rail 18 attached to its lower end.

Two or more cords 20 extend from the foot rail 18, up through the cellular structure 10, and into the headrail 16. Guides 22 may be provided in the headrail 16 to direct the cords 20 towards an opening 24. The head rail 16 may include a conventional locking mechanism (not shown) about the opening 24 for engaging the cords 20 in the locked and unlocked positions.

The cords 20 allow the cellular structure 10 to be moved from a collapsed condition to an expanded condition. The cords 20 collapse the cellular structure 10 by urging the foot rail 18 towards the head rail 16. Furthermore, the cords 20 expand the cellular structure 10 by allowing the weight of the conventional foot rail 18 to pull the lower end of the structure away from the head rail 16.

Figure 2:
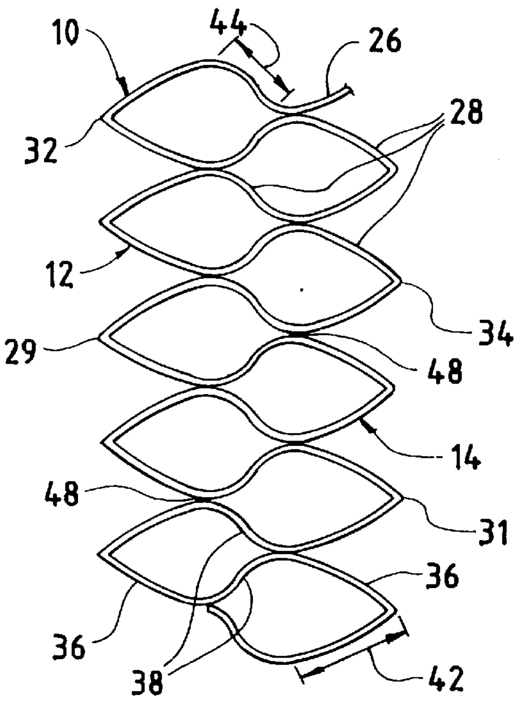
FIG. 2 is an end view of a plurality of cells within the cellular structure of FIG. 1 in a partially collapsed condition.
Figure 3:
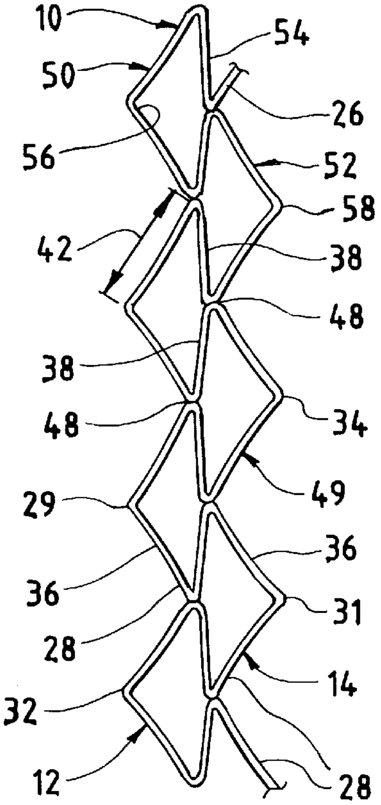
FIG. 3 is an end view of a plurality of cells within FIG. 1 in an expanded condition.

FIGS. 2 and 3 show an end view that illustrates the cellular structure 10 of FIG. 1 in both a partially collapsed and an expanded condition, respectively.

The cellular structure 10 is formed of a single length of resilient material 26 capable of being permanently folded. Materials which are suitable, but not inclusive, include non-woven fibers of polyester, woven materials from plastic, textile fibers, and plastic.

The material 26 is continuously folded back over itself to form several layers 28. The two folds 29,31 used to form each layer 28 are permanently formed by pressing the material at regular intervals and in alternating directions. Thus, the material 26 is collapsed into a single compact stack of substantially coplanar layers 28 when the structure is not being forced to expand. As described further herein, the two folds 29,31 forming each layer 28 provide a front pleat 32 and a rear pleat 34, respectively, on the front surface 12 and the rear surface 14 of the structure 10.

Each layer 28 is demarcated into three (3) substantially planar sections consisting of two outer sections 36 with one support section 38 therebetween. Demarcation of the sections is provided by two (2) lines of adhesive 48 disposed between the folds 29,31 of each layer and on opposite sides of the material 26.

The adhesive lines 48 are located on each layer 28 such that the length 42 of each outer section 36 is greater than the length 44 of each support section. Furthermore, the lengths 42 of the two outer sections 36 are substantially similar to each other.

Although the lines of adhesive 48 are located in generally similar locations on each layer 28, the adhesive is located on opposite sides of each layer such that one adhesive line is provided between each of the layers. The adhesive lines 48 are situated using an alternating pattern which shifts towards the front surface 12 and the rear surface 14 of the structure 10. The adhesive 48 is applied between each layer 28 and results in the attachment of each support section 38 to the support section of an adjacent layer. The adhesive 48 may consist of a line of glue, or any other method of attaching the adjoining layers 28 together such as sonic welding.

As shown in FIG. 3, the structure 10 is expanded by pulling the layers 28 away from each other. A force such as supporting the weight of the foot rail is required to expand the structure 10 due to the tendency of each layer 28 to retain its original planar shape. As the material 26 is expanded, each layer 28 has a zigzag pattern 49 due to the bending of the layers where the adhesive 48 interconnects to the sides of each layer. Furthermore, the support sections 38 are substantially straight in relation to each other since the length 44 of each support section 38 is less than the length 42 of each outer section 36.

Each layer 28 being connected to an adjacent layer results in two substantially parallel columns 50,52 of outer cells 56 being formed on each side of the planar support wall 54 defined by the support sections 38. Each cell 56 has a shape which is generally similar to an isosceles triangle with two support sections 38 forming the base of the triangle and one outer section 36 forming each side.

The substantially straight support sections 38 limit the full extension length of the structure 10 while allowing the two outer sections 36 of each cell to form a pleat 58. Therefore, the front 12 and rear 14 surfaces are uniformly pleated since the support wall 54 ensures that the outer sections 36 of each cell are not strained as the structure 10 is being extended.

The structure 10 is allowed to collapse by either urging the layers 28 towards each other and/or removing any force (e.g., weight of foot rail 18) previously used to expand the structure. The structure 10 will retract into at least a partially collapsed condition, by itself, as the resilient layer material 26 which forms each bent support section 38 is allowed to revert back to its original planar shape.

The material 26 within each layer 28 will return to at least a partially planar condition due to the lack of permanent creases being formed in the resilient material between the folds 29,31 of each layer. The cellular structure 10 shown in FIGS. 1–3 provides a good example of the forces generated to properly collapse the shade. When extended (FIG. 3) the support sections 38 are substantially planar and but for the forces of the rest of the cell could fold at adhesive 48 in either direction. However, the deflection of the outer sections, e.g. 36, together with the shape of the cell generates a force that causes the adhesive 48 to fold away from the pleat 34. Therefore, the cellular structure 10 will always fold as shown in FIG. 2. Moving adhesive 48 toward pleat 34 would require that a force be provided to bind the outer sections, e.g. 36, away from their resilient flat shape. Thus, as can be seen, the shapes and sizes of the respective components generate a force which causes the support side to fold away from the pleated side of the cell. While this has been explained in detail with respect to FIGS. 1–3, it will be apparent that the same force exists in the other embodiments of the present invention.

Figure 4:
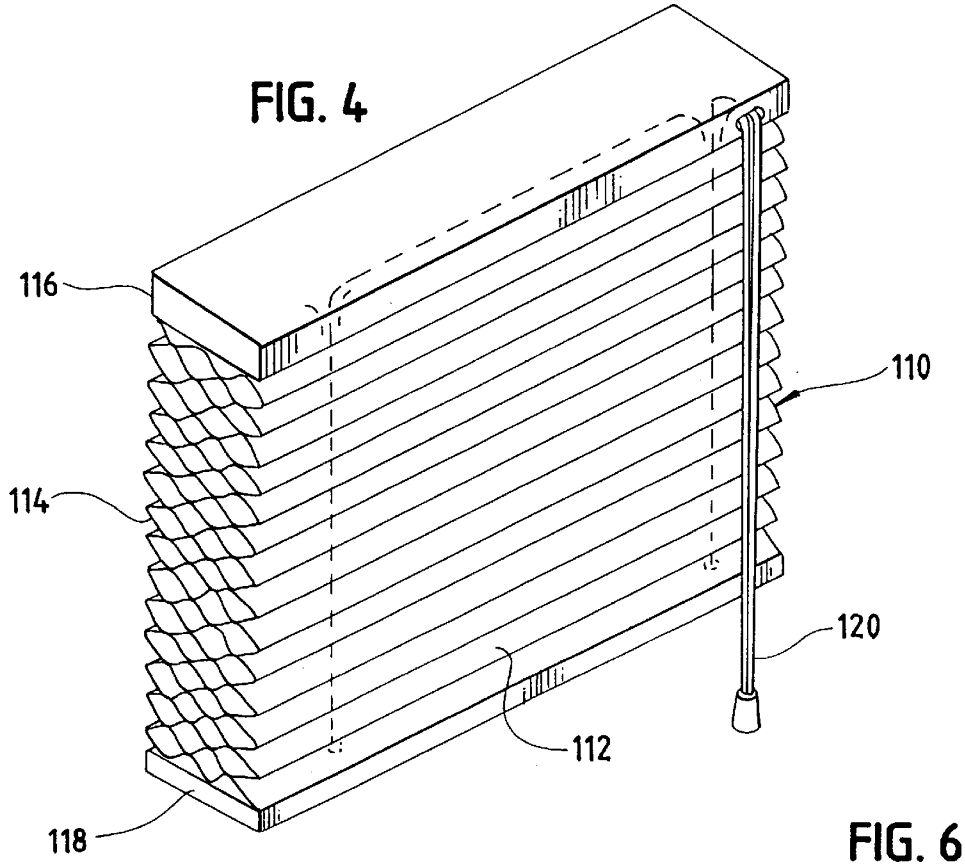
FIG. 4 is a perspective view of a cellular structure embodying the present invention and being in a partially collapsed condition.

FIG. 4 shows a perspective view of another cellular structure 110 in accordance with the present invention. The cellular structure 110 has a front surface 112 and a rear surface 114 and is mounted within the same conventional headrail 116 and foot rail 118 combination as depicted in FIG. 1. Correspondingly, the last two digits in the 100 series of numerals depicted in FIGS. 4–6 are connected to elements which have the same function and/or structure as those described with regard to FIGS. 1–3.

Figure 5:
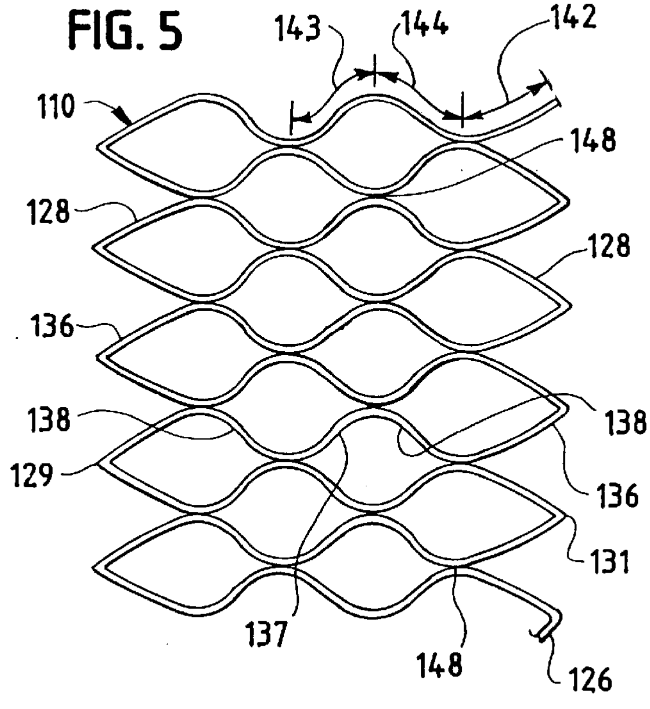
FIG. 5 is an end view of a plurality of cells within the cellular structure depicted in FIG. 4.
Figure 6:
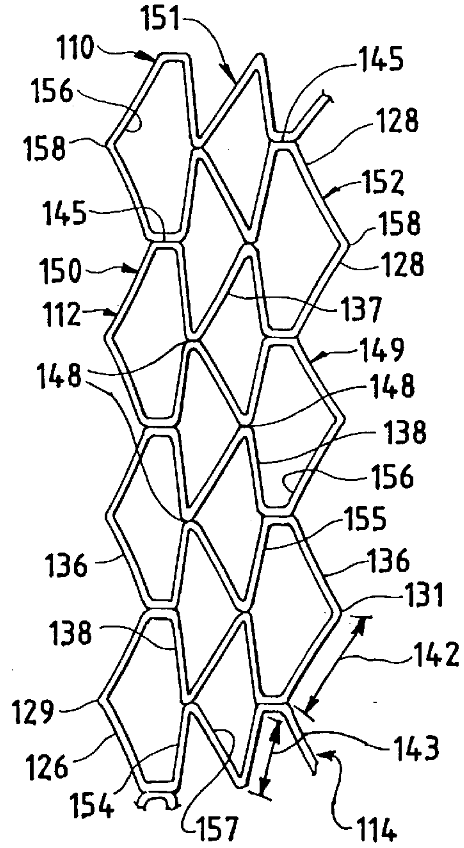
FIG. 6 is similar to FIG. 5 except that the cells are in an expanded condition.

FIGS. 5 and 6 provide an end view of the cellular structure 110 depicted in FIG. 4. The cellular structure 110 is depicted in a partially collapsed condition in FIG. 5 and an expanded condition in FIG. 6.

A single length of material 126 is shaped to form the cellular structure 110. The material 126 is generally resilient with a plurality of folds 129,131 being formed by pressing the material. Suitable resilient materials include polyester, plastic, and textile fibers.

The material 126 is folded back-to-back to form several substantially planar layers 128 of generally equal size. The layers 128 are stacked upon each other such that each layer is adjacent to another layer.

Between the folds 129,131 which distinguish each layer 128 the material can be divided into five (5) generally planar sections: two outer sections 136, one center section 137, and one support section 138 between the center section and each of the outer sections. The sections within each layer 128 are defined by four (4) lines of adhesive 148 which are disposed between the folds 129,131 of each layer.

The adhesive lines 148 are located on opposite sides of each layer 128 in an alternating pattern such that an adhesive line on one side of the material is sandwiched between two adhesive lines disposed on the other side of the layer material. In addition, with regard to each layer 128, the adhesive lines 148 are located such that the length 144 of each support section 138 is less than each outer section length 142 and each center section length 143. Moreover, the outer sections 136 are substantially similar in length to each other and, likewise, the support sections 138 are substantially similar in length to each other.

As shown in FIGS. 4–6, the adhesive lines 148 are located on opposite sides of each layer 128 such that two adhesive lines are provided between each layer in an alternative pattern. Furthermore, between each layer 128, the adhesive line which is closest to the front 112 or rear 114 surface of the structure is wider than the other (i.e., second) adhesive line.

The adhesive 148 is disposed between each layer 128 and results in each support section 138 being attached to the support section of an adjacent layer. The adhesive 148 may consist of a line of glue or any other conventional method of attaching the layers 128 together.

As shown in FIG. 6, when the structure 210 is expanded, each layer 128 has a zigzag pattern 149 due to the interconnected sides of each layer bending at the adhesive lines 148 in an alternating manner. In addition, the interconnected support sections 138 are substantially coplanar in relation to each other since the length of the support sections is less than the length of the outer sections 136 and the center sections 137.

Expanding the layers apart results in a center column 151 of inner cells 157 being vertically disposed between a front column 150 and a rear column 152 of outer cells 156. Moreover, the support sections 138 form substantially parallel support walls 154,15.5 along the center column 151.

Each inner cell 157 within the center column 151 is generally shaped like an isosceles triangle with two support sections 138 forming the base of each triangle and one center section 137 forming each side. Likewise, the outer cells 156 in the front 150 and rear 152 columns are generally shaped like an isosceles triangular with two support sections 138 forming the base of each triangular cell 156 and one outer section 136 forming each side. However, instead of forming a sharp point, the inner sections 145 where each outer cell 156 adjoins to an adjacent outer cell is generally planar.

The parallel support walls 154,155 defined by the straight support sections 138 uphold the weight of the structure 110. Correspondingly, the outer sections 136 do not support any weight and, instead, form pleats 158 along the front 112 and rear 114 surface of the structure 110. Each pleat 158 is uniformly shaped and consists of the fold 129,131 where the outer sections 136 of each cell hinge together.

If allowed, the structure 110 of FIG. 6 will partially collapse, by itself, as the bent layers 128 resiliently revert back to their original planar shape. Correspondingly, in order for the structure to consistently collapse in an orderly manner, it is preferred that no permanent creases be formed in the material between each of the folds 129 and 131.

Figure 7:
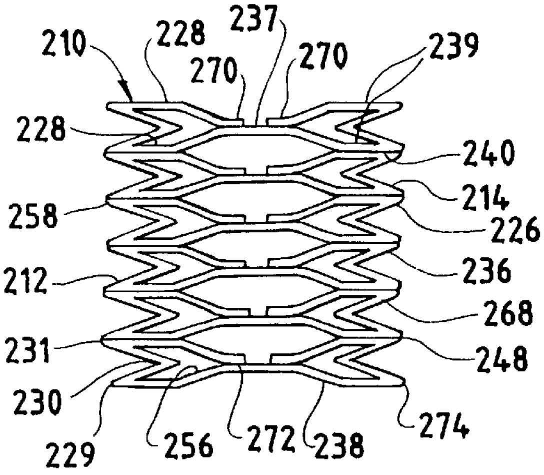
FIG. 7 is an end view illustrating another cellular structure in accordance with the teachings of the present invention and being in a partially collapsed condition.
Figure 8:
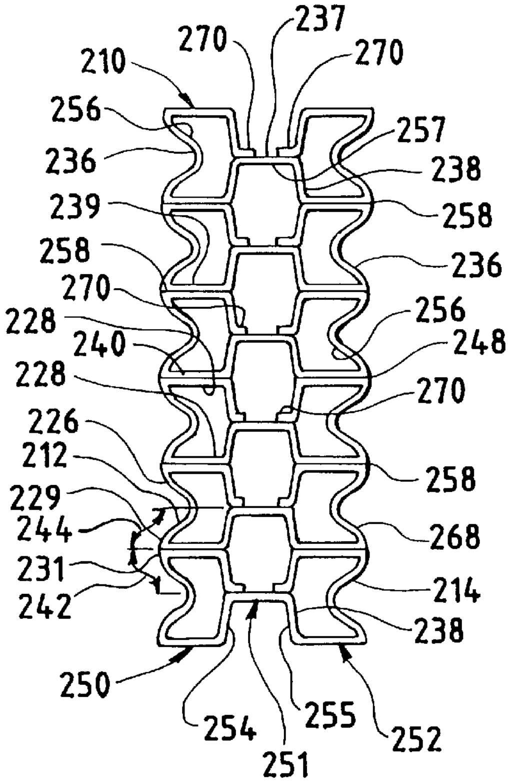
FIG. 8 illustrates the cellular structure of FIG. 7 in an expanded condition.

Referring to FIGS. 7 and 8, another end view of a cellular structure 210 in accordance with the present invention is illustrated in a partially contracted and expanded condition, respectively.

The cellular structure 210 is constructed of several individual sheets 268 of resilient material 226. Each of the sheets 268 are similar in size and shape. The two ends 270 of each sheet 268 are folded back over and attached, by an adhesive line 272, to the same side of the sheet center section 237. Correspondingly, each sheet basically is folded to form two planer layers 228 of material for defining a dual cell configuration 274 having two generally symmetrical outer cells 256.

Each outer cell 256 has three folds 229, 230, and 231 which are pressed in the material at regular intervals and in alternating directions. The three folds allow each cell 256 to be collapsed into a compact stack of substantially coplanar sections 236, 238, and 239. Furthermore, the folds provide the pleated texture along the front surface 212 and the rear surface 214 of the structure 210.

Each outer cell 256 can be divided into generally six (6) planar sections: two outer sections 236, two inner sections 239, and two support sections 238. With regard to each outer cell 256, a support section 238 projects from the center section 237 of the sheet material 226. Likewise, another support section 238 is attached, by using a conventional adhesive 272, onto the center section 237 of the sheet.

Each support section is integrally connected to an inner section 239 which has an adhesive 248 applied to its outer surface 240 and is hinged to an outer section 236 by a fold 229,231. Furthermore, the outer sections 236 are separated from one another by a fold 230 which is disposed between the sections.

The length 242 of the outer sections 236 is greater than the length 244 of the support sections 238. In addition, similar sections within each cell 256 are substantially equal in length to each other. For example, the lengths 244 of the support sections 238 are substantially equal to each other.

Within each outer cell 256 the fold 230 located between the outer sections 236 projects into the cell and towards the support sections 238. Conversely, as stated previously, the folds 229,231 where the outer sections 236 hinge from the inner sections 239 form part of a pleat 258 on the outer surface of the structure 210.

The sheets of material 268 are attached to each other by the adhesive 248 disposed on the outer surface 240 of the cell inner sections 239. Each layer 268 is aligned with the other layers such that the folds 229,231 between the outer sections 236 and the inner sections 239 of each layer adjoin against similar adjacent layer folds.

As shown in FIG. 8, the structure 210 is expanded by pulling the sheets 268 away from each other until the support sections 238 are coplanar to each other. As the structure 210 is expanded, each support section 238 will bend around the area where it attaches to an inner section 239 and connects to, or extends from, a center section 237. Furthermore, the support sections 238 will limit the expansion length of the structure 210 since the length 242 of the hinged outer sections 236 is greater than the length 244 of the support sections.

The connecting of the sheets 268 together results in a center column 251 of inner cells 257 being positioned between a front column 250 and a rear column 252 of outer cells 256. Furthermore, the substantially straight support sections 238 along each side of the center column 251 defines parallel support walls 254 and 255.

Each of the inner cells 257 within the center column 251 is formed by two adjoining layers 268. The inner cells are generally rectangular in shape with two support sections 238 forming each side of the rectangle and each end of the rectangle being provided by a center section 237.

Similarly, the outer cells 256 within the front 250 and rear 252 columns are rectangular in shape with one side being indented. Two support sections 238 form the substantially straight side of each rectangle. In addition, each end of the rectangle is provided by one inner section 239. Furthermore, the two outer sections 236 form the concave side of the rectangle.

The parallel support walls 254,255 defined by the straight support sections 238 sustain the weight of the structure 210. Furthermore, the outer sections 236 form pleats 258 along the front 212 and rear 214 surfaces of the structure 210. Each pleat 258 is uniformly shaped and projects from where the two inner sections 239 adjoin together.

The structure 210 will continuously exert a force to contract itself into at least a partially collapsed condition due to the bent layers 228 of each dual cell configuration 274 straining to regain their originally planar shape. Correspondingly, it is preferred that no permanent creases be formed in the support sections 238 because such creases would prevent the structure 210 from forcibly collapsing in an orderly manner.

Figure 9:
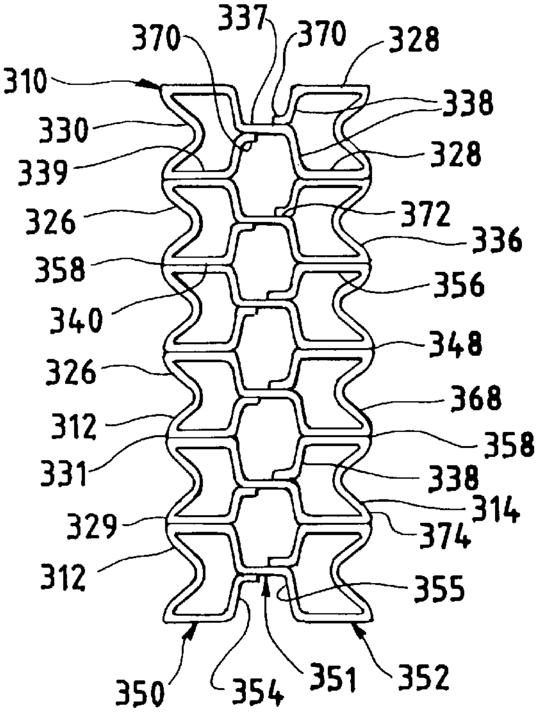
FIG. 9 is an end view illustrating a cellular structure in its expanded condition and being in accordance with the present invention.

FIG. 9 depicts another embodiment of the invention. The cellular structure 310 is similar to the structure 210 shown in FIGS. 7 and 8 except for how the ends 370 of each sheet 368 are connected to the center section 337.

As shown in FIG. 9, each sheet 368 of material is folded such that, although each sheet forms basically two layer 328, its ends 370 are attached to opposite sides of the center section 337. The embodiment depicted in FIG. 9 is otherwise similar to the embodiment depicted in FIGS. 7 and 8 and has the same extended pleated appearance on the front 312 and rear 314 surfaces. Correspondingly, the last two digits in the 300 series of numerals within FIG. 9 are connected to structural elements which have the same function as those described with regard to FIGS. 7 and 8.

Figure 10:
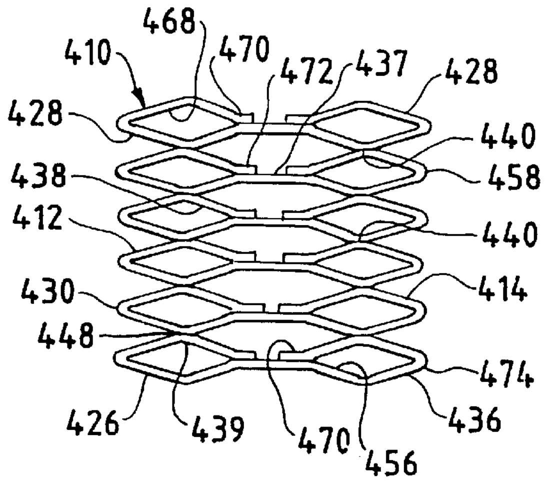
FIG. 10 is an end view illustrating yet another cellular structure in a partially collapsed condition and in accordance with the present invention.
Figure 11:
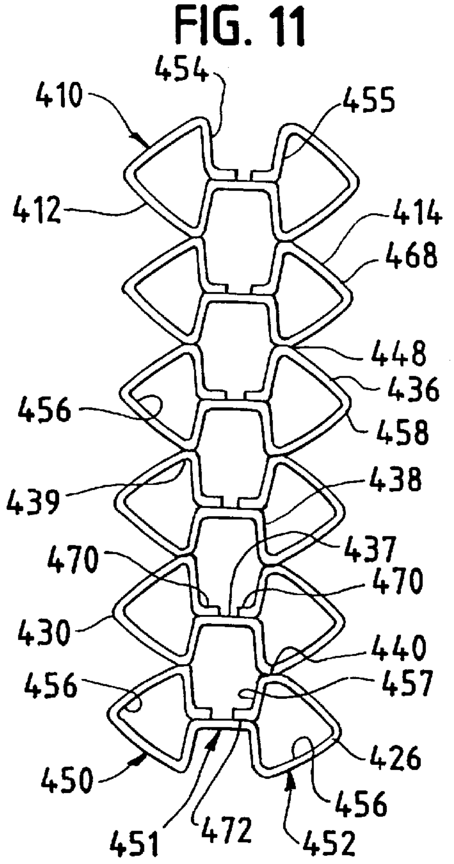
FIG. 11 illustrates the cells of FIG. 10 being in an expanded condition.

FIGS. 10 and 11 depict a further embodiment of the invention as structure 410. The cellular structure 410 is similar to the structure 210 shown in FIGS. 7–8 except for the lengths of the inner sections and the projection of the fold 430 between the outer sections 436 of each cell. Correspondingly, the 400 series of numerals used in FIGS. 10 and 11 have the same last two digits as those elements in FIGS. 7 and 8 which are similar in structure and/or function.

As shown in FIGS. 10 and 11, each outer cell 456 has only one fold 430 for collapsing the cell into a compact stack of substantially coplanar sections 436, 438, and 439. In addition, each fold 430 provides a pleat 458 along either the front surface 412 or the rear surface 414 of the structure 410. Therefore, when collapsed, the fold 430 of each outer cell 456 adjoins against similar adjacent layer folds.

Turning particularly to FIG. 11, when the structure 410 is in the expanded condition the support sections 438 are substantially coplanar to each other. As the structure 410 is expanded, each support section 438 will bend where it attaches to an inner section 439 and connects to, or extends from, a center section 437. In addition, each outer section 436 will bend where it integrally connects to an inner section 439. Finally, the support sections 438 will limit the expansion length of the structure 410 since, within each outer cell 456, the length 444 of the support sections 438 is less than the length 442 of the hinged outer sections 436.

The expansion of the interconnected sheets 468 generates a center column 451 of inner cells 457 sandwiched between a front column 450 and a rear column 452 of outer cells 456. Furthermore, the straight support sections 438 define substantially parallel support walls 454 and 455 along the center column 451.

The outer cells 456 within the front 450 and rear 452 columns are generally triangular in shape. Two support sections 438 form the base of each triangular cell 456 and each side of the triangle is formed by one outer section 436.

The interconnected straight support sections 438 uphold the weight of the structure 410. In addition, as stated previously, pleats 458 are formed along the front 412 and the rear 414 surfaces of the structure 410 by the outwardly projecting folds 230. The pleats 458 are uniformly distributed along the front and rear surface since the outer sections 436 do not contribute in supporting the weight of the structure 410.

The structure 410 will forcibly attempt to contract itself into at least a partially collapsed condition as the resilient support sections 438 and the resilient outer sections 436 strain to regain their original planar shape. Correspondingly, it is preferred that no creases be formed in the support sections or the outer sections since the resiliency of the sections provide for the collapsing of the structure 410 in an orderly manner.

Figure 12:
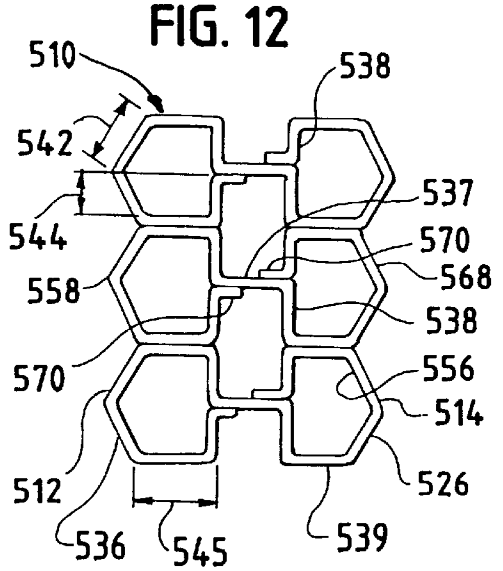
FIG. 12 is an end view of still yet another cellular structure embodying the present invention and being in a fully expanded condition.

Another cellular structure 510 embodying the present invention is depicted in FIG. 12 in a fully expanded condition. The structure 510 is like the structure 410 illustrated in FIGS. 10 and 11 except for the relationship between the lengths of the outer and inner sections of each outer cell 556 and how the ends 570 of each sheet 568 are attached back onto the center section 537. Correspondingly, the 500 series of numerals in FIG. 12 use the last two digits as those elements in FIGS. 10 and 11 which have a similar structure and/or function.

With regard to FIG. 12, each sheet layer 568 is folded such that the ends 570 of the material 526 attach to opposite sides of the center section 537. Furthermore, with regard to each outer cell 556, the length 544 of each support section 538 is only slightly less than the outer section length 542 and the inner section length 545.

The protrusion of each pleat 558 from each outer cell 556 will diminish as each outer section length 542 approaches the length 544 of each support section 538. Therefore, the pleat 558 is present as long as the length 542 of the outer sections 536 of each cell is greater than the length 544 of the support sections 538.

Figure 13:
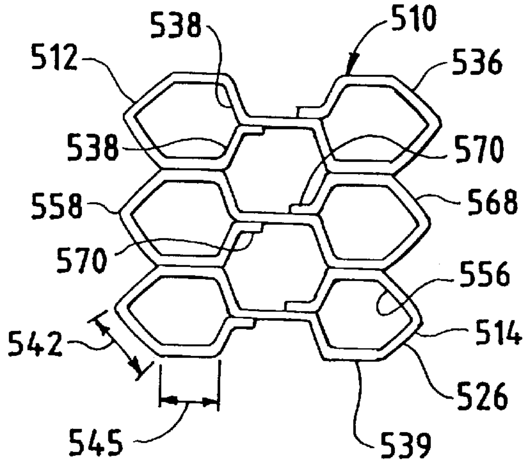
FIG. 13 is similar to FIG. 12 with the cells in an expanded condition.

Other than the above mentioned differences, the embodiment depicted in FIG. 12 is similar to the embodiment depicted in FIGS. 10 and 11 and thus has a uniformly pleated appearance on the front 512 and rear 514 surfaces when extended. However, the embodiment of FIG. 12 is fully expanded such that each support section 538 forms a straight length. Conversely, the embodiment of FIG. 13 depicts the cellular structure 510 being expanded to a state such that the support sections 538 are substantially coplanar to each other with each support section being arcuate.

With regard to the preferred embodiments depicted in FIGS. 1–13, like sections of each outer cell are depicted as being substantially equal in length. For example, the outer sections of each cell are equal in length to each other. However, if so desired, there is no need for like sections of each cell to have a substantially equal length.

It will be readily apparent from the foregoing detailed description of the invention and from the illustrations thereof that numerous variations and modifications may be effected without departing from the true spirit and scope of the novel concepts or principles of this invention.

What is claimed is:

1. A collapsible covering having a front surface and a rear surface and comprising a plurality of cells on each of the front and rear surfaces, each cell including a pleated side on one of the front and rear surfaces and an opposing support side, with the pleated side having a fold defined by the material, the pleated side remaining pleated and the support side being substantially flat and coplanar with the support sides of the other cells when the covering is extended; and the material of each cell resiliently applying a force to fold the support side away from the pleated side when the covering is collapsed.

2. The collapsible covering of claim 1 wherein each cell has a triangular shape.

3. The collapsible covering of claim 1 wherein the fold in each cell protrudes away from the support side of the cell.

4. The collapsible covering of claim 1 wherein the fold in each cell protrudes towards the support side of the cell.

5. The collapsible covering of claim 1 wherein the cells are configured into a front and rear column of outer cells.

6. The collapsible covering of claim 5 wherein the outer cells have an identical shape and the material is folded to form a column of inner cells.

7. The collapsible covering of claim 6 wherein the inner cells have a shape different from the shape of the outer cells.

8. The collapsible covering of claim 6 wherein each of the inner cells has a triangular shape.

9. The collapsible covering of claim 1 further including a plurality of material sheets, each sheet defining the outer cells and having two ends with each end folded back onto the material to form the outer cells in a symmetric relation, wherein the plurality of sheets are attached together to define an inner cell.

10. The collapsible covering of claim 9 wherein the ends attach to opposite sides of the material.

11. The collapsible covering of claim 9 wherein the inner cell has a rectangular shape.

12. The collapsible covering of claim 1 wherein the covering is attached to a headrail and a foot rail.

13. A collapsible window covering comprising a length of material folded to form a plurality of planar layers, each layer connected by an adhesive line to an adjacent layer to define two outer cells, each cell having a pleated side with a fold defined by the material and an opposing support side having a substantially straight length, the length of material forming the support side being less than the material forming the pleated side, and, when the collapsible window covering is extended by bending each layer, the support side of the cells extending in a planar relationship to each other and each of the layers apply a force to collapse the covering.

14. The collapsible window covering of claim 13 wherein each outer cell has a triangular shape.

15. The collapsible window covering of claim 13 wherein the fold of each cell protrudes from the cell.

16. The collapsible window covering of claim 13 wherein the fold of each cell protrudes into the cell.

17. The collapsible window covering of claim 13 wherein the outer cells have an identical shape to each other.

18. The collapsible window covering of claim 17 wherein the material is folded to form an inner cell.

19. The collapsible window covering of claim 18 wherein the inner cell has a shape which is different from the outer cells.

20. The collapsible window covering of claim 19 wherein the inner cell has a triangular shape.

21. The collapsible window covering of claim 13 further including a plurality of sheets of material, each defining the outer cells and having two ends with each end folded back onto the material to form the outer cells in a symmetric relation to each other, wherein the plurality of sheets are attached together to define an inner cell.

22. The collapsible window covering of claim 21 wherein the ends attach to opposite sides of the material.

23. The collapsible window covering of claim 21 wherein the inner cell has a rectangular shape.

24. The collapsible window covering of claim 13 wherein the covering is attached to a head rail.

25. The collapsible window covering of claim 24 wherein the covering is attached to a foot rail.

26. A window covering comprising:

a) headrail;

b) a plurality of generally vertically disposed cells of material attached to the headrail, the cells collectively defining a support wall and a front surface and a rear surface, the support wall being substantially planar and the front and rear surfaces having pleats when the window covering is extended;

c) the support wall applying a force to urge the covering into a collapsed condition; and d) a foot rail having sufficient weight to extend the window covering.

27. The window covering of claim 26 wherein the pleats are uniformly disposed on the front and rear surfaces.

* * * * *